US011235638B2

(12) United States Patent
Neveu et al.

(10) Patent No.: US 11,235,638 B2
(45) Date of Patent: *Feb. 1, 2022

(54) THERMAL MANAGEMENT SYSTEM FOR A MOTOR VEHICLE AND CORRESPONDING THERMAL MANAGEMENT METHOD

(71) Applicant: Valeo Systemes Thermiques, Le Mesnil-Saint-Denis (FR)

(72) Inventors: Daniel Neveu, Le Mesnil Saint Denis (FR); Didier Barat, Le Mesnil Saint Denis (FR); Sophie Bede, Le Mesnil Saint Denis (FR); Xavier Rousseil, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 238 days.

This patent is subject to a terminal disclaimer.

(21) Appl. No.: 16/549,257

(22) Filed: Aug. 23, 2019

(65) Prior Publication Data

US 2019/0375271 A1  Dec. 12, 2019

Related U.S. Application Data

(63) Continuation of application No. 15/758,152, filed as application No. PCT/EP2016/065281 on Jun. 30, 2016, now Pat. No. 10,442,271.

(30) Foreign Application Priority Data

Sep. 8, 2015 (FR) .................................. 1558322

(51) Int. Cl.
*B60H 1/00* (2006.01)
*B60H 1/22* (2006.01)
(Continued)

(52) U.S. Cl.
CPC ..... *B60H 1/00742* (2013.01); *B60H 1/00292* (2013.01); *B60H 1/2225* (2013.01);
(Continued)

(58) Field of Classification Search
CPC ............ B60H 1/00742; B60H 1/00292; B60H 1/2225; B60N 2/56; B60N 2/5678; B60N 2/5685; G06K 9/00845; G06K 9/2018
See application file for complete search history.

(56) References Cited

U.S. PATENT DOCUMENTS 6,439,468 B1 *  8/2002  Lambert ................ B64D 13/00
                                                   236/49.3
10,442,271 B2 * 10/2019  Neveu ................ B60H 1/00742
(Continued)

*Primary Examiner* — Peter D Nolan
*Assistant Examiner* — Wae L Louie
(74) *Attorney, Agent, or Firm* — Osha Bergman Watanabe & Burton LLP (57) ABSTRACT

The invention relates to a thermal management system (1) for a motor vehicle, comprising:
at least one sensor (13, 113) capable of measuring at least one quantity that can be used to determine at least one thermal comfort data item (TS),
a predefined number of actuators (A101, A102, A103, A104), configured, respectively, for adjusting at least one parameter of an associated piece of equipment (3, 5, 7, 9) of said vehicle, and
a control device (12) for controlling the actuators (A101, A102, A103, A104) on the basis of the measurements of said at least one sensor (13, 113).
According to the invention, the control device (12) comprises at least one processing means (14) for:
identifying at least a first and a second piece of equipment for acting on a first and a second part of the occupant's body, respectively, if thermal regulation of the occupant is required, and
controlling at least a first and a second actuator configured, respectively, for adjusting at least one parameter
(Continued)

of the first and second pieces of equipment identified, so as to act on said parts of the occupant's body.

The invention also relates to a thermal management method implemented by such a system (1).

9 Claims, 2 Drawing Sheets

(51) Int. Cl.
*G06K 9/20* (2006.01)
*G06K 9/00* (2006.01)
*B60N 2/56* (2006.01)

(52) U.S. Cl.
CPC ............. *B60N 2/56* (2013.01); *B60N 2/5678* (2013.01); *B60N 2/5685* (2013.01); *G06K 9/00845* (2013.01); *G06K 9/2018* (2013.01); *B60H 1/00392* (2013.01)

(56) References Cited

U.S. PATENT DOCUMENTS

| | | | |
|---|---|---|---|
| 2002/0110178 A1* | 8/2002 | Puranen | G01J 5/04 374/121 |
| 2011/0172880 A1* | 7/2011 | Tamura | B60H 1/00771 701/36 |
| 2013/0232996 A1* | 9/2013 | Goenka | B60N 2/56 62/3.61 |
| 2014/0148706 A1* | 5/2014 | Van Treeck | A61B 5/0077 600/474 |
| 2015/0075763 A1* | 3/2015 | Kim | B60H 1/00742 165/203 |
| 2015/0148628 A1* | 5/2015 | Abreu | A61B 5/02416 600/316 |
| 2015/0231991 A1* | 8/2015 | Yetukuri | B60N 2/002 297/284.11 |
| 2016/0214456 A1* | 7/2016 | Maranville | B60H 1/00971 |
| 2017/0108236 A1* | 4/2017 | Guan | H05B 47/105 |
| 2017/0136842 A1* | 5/2017 | Anderson | A61B 5/4023 |
| 2019/0375271 A1* | 12/2019 | Neveu | G06K 9/2018 |

* cited by examiner

THERMAL MANAGEMENT SYSTEM FOR A MOTOR VEHICLE AND CORRESPONDING THERMAL MANAGEMENT METHOD

The invention relates to a thermal management system for a motor vehicle. The invention also relates to a thermal management method implemented by such a thermal management system.

Thermal comfort in a passenger compartment, such as a motor vehicle passenger compartment, is conventionally provided by adjusting the flow rate, temperature, moisture content and orientation of the air blown into the passenger compartment through various diffusers.

The arrangement of the diffusers in vehicles, notably in front, or near the rear passengers, whether in the side columns between doors or in the center console or, in some cases, in the roof, and the management of the flow rates and temperatures, are intended to provide pleasant local conditions for each passenger, while also keeping the general average temperature in the passenger compartment at about 20° C.

Other elements of the passenger compartment, such as the glazing units, the dashboard, the steering wheel and seats, also contribute, by contact or radiation, to the sensation of thermal comfort or discomfort experienced by the driver or a passenger in the vehicle.

Supplementary devices have been developed for improving and/or customizing thermal comfort by contact, including, notably, heated or cooled seats and heated steering wheels.

Additionally, in winter and summer, the glazing units are at a temperature close to the outside temperature, and their infrared radiation toward the passengers makes a significant contribution to the sensation of thermal comfort or discomfort. It has been possible to reduce the solar radiation entering the passenger compartment by treating the glazing units. More recently, the treatment of the inner surfaces of glazing units with low emissivity coatings has made it possible to reduce the infrared radiation of the glazing units toward the passengers.

Thus the sensation of thermal comfort in a passenger compartment results from a combination of different thermal contributions, notably by convection in the air, radiation from the glazing units and internal walls, and contact with the seat.

In known solutions, the management of the flow rate and temperature of the air is the main variable for the adjustment of thermal comfort.

The principles of thermal comfort are mainly based on curves of air flow rate and temperature as a function of the ambient temperature, to be maintained in accordance with a comfort objective to be achieved.

Thus there is a known way of using automatic control systems for an air conditioning installation, that is to say an installation including, notably, heating, ventilation and/or air conditioning within a vehicle. Such control systems manage thermal comfort automatically on the basis of at least one chosen aerothermal parameter (such as the air flow temperature, the air flow rate and/or the distribution of the air flow toward the passenger compartment through one or more diffusers) and external data such as the difference between the inside and outside temperature, the solar flux received by the occupant or occupants of the passenger compartment, and the like.

There are known control systems comprising an infrared sensor for measuring the skin temperature of a passenger's head, and using the detected temperature to adjust or modify the aerothermal parameters in the passenger compartment, including the temperature, flow rate, and air distribution.

In particular, the patent FR 2 917 855 describes a control system having at least one sensor, notably a physiological data sensor, such as an infrared sensor capable of measuring a plurality of thermal quantities, each related to a body area of a passenger or of the driver of the motor vehicle. The measurements made by this sensor are used in the control system to determine a thermal comfort data item for the passenger, and this thermal comfort data item is used for the adjustment of the air temperature, the air flow rate and the air distribution. In particular, this document disclosed a method of measuring the inside temperature of the passenger compartment and the body temperature of the occupant or occupants of the vehicle at different points, notably at different specific points on the face such as the nose, the cheeks and the forehead, in order to determine a thermal comfort data item for the occupant. This thermal comfort data item is determined according to a mathematical formula based on the thermal sensations of a panel representative of the population whose body temperature has been measured in different conditions.

In the solutions described above, thermal comfort management is based on the management of the average temperature of the passenger compartment, and takes place, notably, by means of the control of one or more air setpoints in the passenger compartment. An insolation sensor is also used in some cases to correct the comfort principles on the basis of the direct solar flux received by the occupants of the vehicle.

However, the thermal power used to provide thermal comfort for the occupant or occupants of the vehicle is often disproportionate to the real requirements. In particular, for an electric vehicle, when the aim is to heat the passenger compartment, for example, the energy losses cannot be exploited as they could in a vehicle with a heat engine, and this results in additional electricity consumption.

The power use is even greater in transient situations, typically on entry to a vehicle in summer or winter, where the aim is to achieve thermal comfort as soon as possible and reduce the discomfort of occupants during these transient phases of passenger compartment air conditioning.

Furthermore, the thermo-physiological requirements for compensation for a hot or cold environment in a person's body are of the order of several hundred watts, whereas the power used for thermal regulation in a passenger compartment is of the order of several kilowatts. This is due to the fact that the known solutions do not merely satisfy a condition of thermal comfort temperature for the occupant or occupants of the vehicle, but establish a thermal comfort temperature throughout the passenger compartment.

A logic of global air management is therefore inappropriate. It is desirable, notably, to manage the thermal inputs on a more local basis, for better adaptation to the requirements of the vehicle's occupants.

Additionally, vehicles tend to be increasingly autonomous, which may lead to a modification of the position of the occupants in the passenger compartment, so that the arrangement of the diffusers, for example, is more appropriate. The thermal comfort management strategy must be reconsidered to allow adaptation to possible changes of position in the passenger compartment.

One object of the invention is therefore to overcome, at least partially, these problems of the prior art, by proposing a thermal management system for regulating the thermal state of an occupant while reducing the thermal power used.

For this purpose, the present invention proposes a thermal management system for a motor vehicle, said vehicle comprising at least two pieces of equipment, said thermal management system comprising:

at least one sensor capable of measuring at least one quantity that can be used to determine at least one thermal comfort data item representative of the thermal state of at least one occupant of said vehicle, a predefined number of actuators, configured, respectively, for adjusting at least one parameter of an associated piece of equipment capable of regulating the thermal state of the occupant, and an actuator control device capable of:
    determining at least one thermal comfort data item on the basis of the measurements of said at least one sensor, and capable of:
    using said at least one thermal comfort data item for determining whether thermal regulation is required, and for controlling the actuators.

According to the invention, the control device comprises at least one processing means, for performing the following operations on the basis of said at least one thermal comfort data item:

identifying at least a first piece of equipment for acting on a first part of the occupant's body and a second piece of equipment for acting on a second part of the occupant's body, which for example is different from the first part, and controlling at least a first actuator configured for adjusting at least one parameter of the first piece of equipment identified, and controlling a second actuator configured for adjusting at least one parameter of the second piece of equipment identified, so as to act on said parts of the occupant's body, for example by acting in a differentiated way on different parts of the occupant's body.

Thus the invention makes it possible to act in a differentiated way on one or more parts of the body, such as the head, the nape of the neck, the shoulders, the hands, the feet and ankles, the arms, the legs, the chest and the back, by the local application of heat flows which are, for example, of different kinds. The thermal management system makes it possible to act directly on the occupant, and not only on the environment of the occupant.

In particular, the invention makes it possible to combine a plurality of pieces of equipment forming heat sources, in order to act at different points on the body of the occupant of the vehicle. The expression "heat source" is taken to mean an element or piece of equipment which can deliver hot and/or cold in the form of a heat flow, for example a flow of hot air and/or a flow of cold air, or alternatively a flow provided by thermal radiation.

This differentiated action on the body is, notably, useful for the application of positive stimuli in transient situations, such as welcome phases. Localized thermal stimuli give the occupant a generally positive sensation while waiting for the body to reach thermal neutrality.

The combination of the available heat sources in the vehicle on different parts or areas of the occupant's body provides personalized comfort at a lower energy cost. This is because acting as closely to the user as possible reduces the energy consumption required to bring the occupant into a thermal comfort area, compared with the prior art solutions which concentrate solely on the thermal environment of the occupant.

More particularly, the thermal management system according to the invention is adapted so that the first part of the occupant's body and the second part of the occupant's body are different, the thermal management system being capable of acting in a differentiated way on the different parts of the occupant's body.

According to a preferred embodiment, the thermal management system comprises a means for acquiring at least one temporal data item of a usage scenario of said vehicle, said at least one temporal data item being usable for the identification of said pieces of equipment to be controlled so as to regulate the thermal state of the occupant locally in different parts of his body.

The expression "usage scenario of the vehicle" is taken to mean a scenario which defines the way in which the vehicle is used and the interaction of the occupant or occupants with the vehicle. Notably, the usage scenario of the vehicle may comprise a temporal sequence of the use of the vehicle, stating for example if the occupant has just entered the vehicle, or if he has been in the vehicle for a long time, or the period for which the vehicle has been travelling, and whether the vehicle is in manual or automatic driving mode.

According to one embodiment, said at least one sensor comprises at least one thermal state sensor, such as an infrared sensor, capable of measuring at least one thermal quantity relating to the thermal state of at least one occupant of said vehicle. In particular, the infrared map of the face (nose, cheeks, forehead) forms a rich and robust data item, and may be used to provide a measurement of comfort based on thermo-physiological quantities directly representative of the sensation of comfort.

Said at least one thermal state sensor may comprise at least one camera sensitive to wavelengths in the mid-infrared spectrum.

In a variant, or additionally, said at least one thermal state sensor may comprise at least one camera sensitive to wavelengths in the visible spectrum and/or in the near infrared spectrum.

According to an example of embodiment, said at least one sensor comprises a predetermined number of sensors of the thermal environment in the passenger compartment of said vehicle. The control device is capable of using the measurements of the thermal environment sensors for determining at least one thermal comfort data item relating to the occupant.

For example, the thermal environment sensors in the passenger compartment are capable of measuring at least one quantity chosen from among aerothermal parameters, the surface temperature of a piece of equipment in the vehicle, such as at least one seat or the steering wheel or at least one glazing unit, a temperature difference between the inside and the outside of the passenger compartment, the average inside temperature in the passenger compartment, and the solar flux. The thermal environment sensors in the passenger compartment may also detect the operation of a piece of equipment for regulating the thermal state.

According to a preferred embodiment, the control device comprises at least one processing means for determining said at least one thermal comfort data item relating to the occupant, using an algorithm based on a chosen comfort model comprising at least one thermo-physiological model based on the thermal sensations of a panel representative of the population whose body temperature has been measured in different conditions.

In particular, the system for managing the thermal comfort of the passengers is capable of using and combining measurements relating to the occupant's thermal state, for example measurements of the infrared emission of the passengers, combined with the use of the chosen thermal comfort model to quantify and predict the sensation of comfort of one or more occupants of the vehicle.

According to an aspect of the invention, the first and second pieces of equipment allow thermal exchanges of different kinds, for example by convection, radiation or conduction. By activating at least two pieces of equipment of the vehicle to allow thermal exchanges of different kinds (convective, radiative or by contact), the heat flows required for the implementation of thermal comfort can be supplied locally.

According to an example of embodiment, at least one actuator is configured for adjusting at least one aerothermal parameter of a piece of equipment of a heating, ventilation and/or air conditioning installation of said vehicle, such as the temperature, flow rate, or distribution of an air flow directed to the passenger compartment.

According to an example of embodiment, at least one actuator is configured for adjusting at least one thermal parameter of a piece of equipment provided in the passenger compartment of said vehicle, such as a glazing unit, the steering wheel or a seat, so as to adjust the thermal state of a given part of the occupant's body.

For example, the surface temperature of the given piece of equipment may be modified.

According to another aspect of the invention, one of the different parts of the occupant's body is at least one area of the face, the nape of the neck, at least one shoulder, the chest, the back, at least one hand, at least one arm, at least one leg, at least one foot and/or one ankle.

According to another aspect of the invention, the thermal management system comprises at least one identification means capable of locating at least one part of the occupant's body in space. The identification means is, for example, capable of using the measurements made by said at least one sensor, notably said at least one thermal state sensor, to locate at least a part of the occupant's body in space.

Advantageously, the identification means is capable of determining the position of the occupant's body. One of the advantages of the invention is that it can be adapted to changes in the usage of motor vehicles, particularly the fact that the passengers can take up different positions in the passenger compartment if the driving of the vehicle becomes increasingly autonomous. For example, in the case of autonomous driving, the occupants may have their heads turned toward one another in order to converse.

According to one embodiment, said at least one sensor is capable of capturing at least one image or sequence of images which are advantageously infrared and/or combined with at least one image in the visible domain, and the identification means comprises at least one image processing means for locating at least one part of the occupant's body on the basis of captures of an image or images, and also, advantageously, for determining the occupant's position.

The identification of the position of the occupant's body is advantageously used to control the type and location of the pieces of equipment forming heat sources to be activated or adjusted. Thus the invention offers a degree of flexibility in the use of the heat sources in the future autonomous vehicle.

The invention also relates to a thermal management method implemented by a thermal management system as defined above, the thermal management method comprising the following steps:
  acquiring a measurement or measurements of at least one quantity that can be used to determine at least one thermal comfort data item representative of the thermal state of at least one occupant of said vehicle,
  determining at least one thermal comfort data item on the basis of said at least one measured quantity,
  on the basis of said at least one determined thermal comfort data item, identifying the need to regulate the thermal state of the occupant,
characterized in that, if regulation of the thermal state of the occupant is necessary, said thermal management method further comprises the following steps:
  determining at least a first and a second part of the occupant's body, which are different from one another, on which to act in order to regulate the occupant's thermal state,
  for each part of the body determined in the above step, identifying an associated piece of equipment for acting on this part of the body,
  controlling at least a first actuator configured for adjusting at least one parameter of a first associated piece of equipment capable of acting on the first part of the occupant's body, and a second actuator configured for adjusting at least one parameter of a second associated piece of equipment capable of acting on the second part of the occupant's body in a differentiated way relative to the first piece of equipment.

Thus the thermal management method enables the comfort of each occupant to be regulated on the basis of a measurement of the sensation of comfort, for example by means of his infrared "signature" (at his head and/or his hands) measured in real time, by locally supplying heat flows, advantageously of different kinds, to different parts of the occupant's body.

According to an aspect of the invention, said thermal management method further comprises a step of acquiring at least one temporal data item concerning the usage scenario of said vehicle, and takes said at least one temporal data item into account for the determination of the parts of the body on which to act in order to regulate the thermal state of the occupant.

According to another aspect of the invention, control signals for controlling said actuators are generated.

The control signals SC advantageously comprise at least one data item concerning the location of the pieces of equipment to be controlled.

According to one embodiment, the control signals comprise at least one data item concerning the power of the associated piece of equipment.

According to one embodiment, the control signals comprise at least one predefined timing data item. This may be a predefined period for the use of a given piece of equipment. In a variant, or additionally, it may be the reaching of a condition of thermal neutrality, that is to say when the occupant feels neither hot nor cold; for example, provision may be made to use the piece of equipment until the determined thermal comfort data item is representative of a state of thermal neutrality of the occupant.

In particular, the control signals may comprise a combined data item comprising a predefined period for the use of this piece of equipment at a defined power, followed by a reduction in the power of this piece of equipment. In a variant, or additionally, provision may be made to reduce the power of the piece of equipment when the determined thermal comfort data item is representative of a state of thermal neutrality of the occupant.

Other characteristics and advantages of the invention will be more clearly apparent from the perusal of the following description, provided as an illustrative and non-limiting example, and the appended drawings, of which.

Identical elements in the various figures bear the same references.

The following embodiments are examples. Although the description refers to one or more embodiments, this does not necessarily mean that each reference relates to the same embodiment, or that the characteristics are applicable to a single embodiment only. Simple characteristics of different embodiments may also be combined to provide other embodiments.

In the description, some elements or parameters, for example a first element or a second element, a first parameter and a second parameter, or a first criterion and a second criterion, etc., may be listed. In this case, the listing is simply for the purpose of differentiating and naming elements or parameters or criteria that are similar but not identical. This listing does not imply the priority of any element, parameter or criterion relative to another, and these names may easily be changed without departing from the scope of the present description. Furthermore, this listing does not imply a sequence in time, for example, for the evaluation of one or other criterion.

Figure 1:
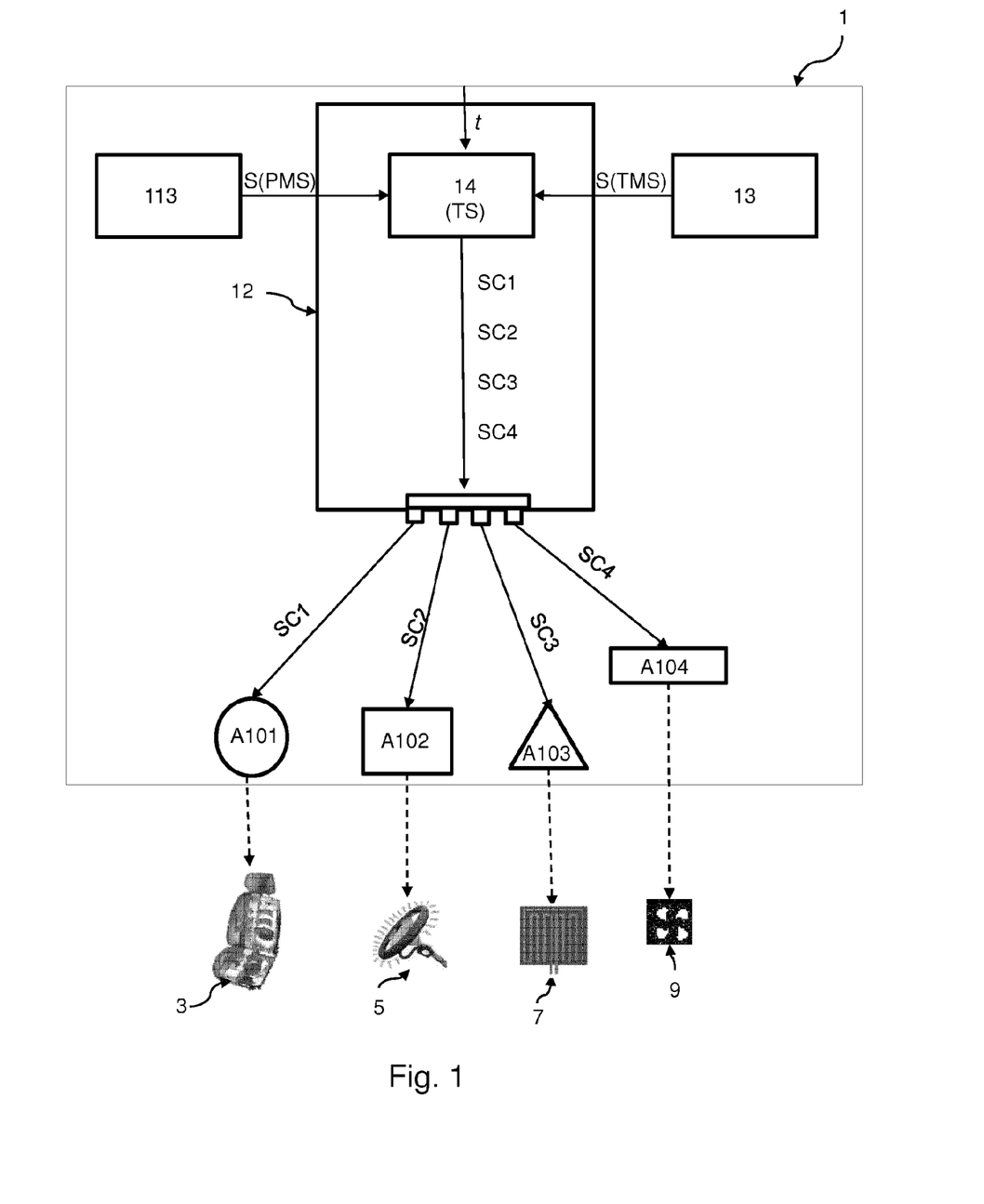
FIG. 1 shows a schematic representation of a thermal management system according to the invention for a motor vehicle.

The invention relates to the management of thermal comfort, notably in a motor vehicle passenger compartment, using a thermal management system 1 for a motor vehicle, as shown schematically in FIG. 1.

In a known way, a vehicle comprises a plurality of pieces of equipment 3, 5, 7, 9 for providing heat exchanges in order to modify the thermal state of one or more occupants of the vehicle. A passenger or the driver of the vehicle is designated by the generic term "occupant".

These pieces of equipment 3, 5, 7, 9 are also called heat sources. The expression "heat source" is taken to mean that these pieces of equipment can be used to deliver hot and/or cold in the form of a heat flow.

These different pieces of equipment 3, 5, 7, 9, or heat sources, of the vehicle are usually of different kinds; that is to say, they provide heat exchanges according to phenomena of different kinds, using different heat flows. The following heat flows may be mentioned by way of example:
- convective, via the air,
- radiative, originating from the sun or radiating surfaces such as a hot dashboard or a cold glazing unit, or
- conductive, originating from surfaces in contact with the occupants of the vehicle, such as a seat or the steering wheel. Thus it is possible to act more closely to the occupant in order to regulate his thermal state, that is to say if he feels hot or cold.

Thermal Management System

The thermal management system 1 for a motor vehicle comprises:
- a predefined number of actuators A101, A102, A103, A104, associated, respectively, with one or more pieces of equipment 3, 5, 7, 9 in the vehicle, a control device 12 for controlling the actuators A101, A102, A103, A104, and
- at least one sensor 13, 113 capable of communicating with the control device 12 to allow the control of at least some of the actuators A101, A102, A103, A104 on the basis of the measurements of the sensor or sensors 13, 113.

In the example shown schematically in FIG. 1, four actuators A101 to A104 are represented. Evidently, more actuators, or only two or three actuators, may be provided.

The actuators A101 to A104 act on, or control, an associated piece of equipment 3, 5, 7, 9, respectively, of the vehicle, so as to activate or modify an operating parameter of the piece of equipment 3, 5, 7, 9 in order to regulate the thermal state of the occupant, or more precisely to regulate a respective associated part of the occupant's body.

The actuators A101 to A104 are therefore configured, respectively, for adjusting at least one parameter of an associated piece of equipment 3, 5, 7, 9, this parameter being capable of acting on the regulation of the thermal state of the occupant. In particular, it is possible to provide, at least,
- a first actuator configured for adjusting at least one parameter of a first associated piece of equipment capable of regulating the thermal state of the occupant at a first part of the occupant's body, and
- a second actuator configured for adjusting at least one parameter of a second associated piece of equipment capable of regulating the thermal state of the occupant at a second part of the occupant's body, different from the first part of the occupant's body.

At least one or more of the actuators A104 may be used to adjust at least one aerothermal parameter of the air flow in an air conditioning installation, that is to say in a heating, ventilation and/or air conditioning installation of the vehicle (not shown in the drawings). The aerothermal parameters generally used in a ventilation, heating and/or air conditioning installation are the air flow temperature, the moisture content, the air flow rate, and/or the distribution of the air flow in the passenger compartment. By way of example, the patent FR 2,917,855 describes thermal management by action on aerothermal parameters in an air conditioning installation of a motor vehicle.

Additionally, at least one or more of the actuators A101, A102, A103 may be used to adjust at least one parameter of a piece of equipment provided in the passenger compartment of said vehicle, such as a glazing unit, or a seat 3, or the steering wheel 5, or a radiant panel 7, so as to regulate the thermal state of the occupant locally, at a given part of his body.

Figure 2:
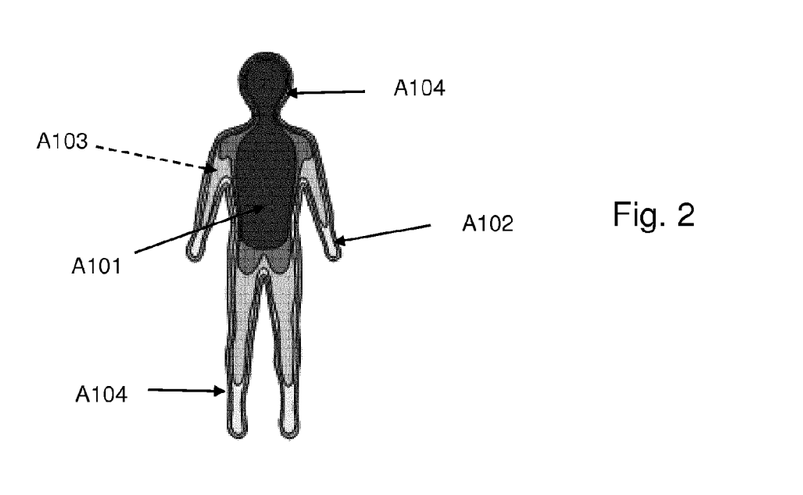
FIG. 2 shows, in a schematic way, the body of an occupant of the vehicle and the corresponding actuator of the thermal management system to be controlled according to the part or area of the body of the occupant of the vehicle.

By way of an illustrative and non-limiting example, with reference to FIGS. 1 and 2:
- the actuator A101 may be used to adjust at least one parameter of a seat 3, for example the temperature of the seat 3, enabling the occupant's temperature to be regulated at his back,
- the actuator A102 may be used to adjust at least one parameter of the steering wheel 5, for example the temperature of the steering wheel 5, enabling the occupant's temperature to be regulated at his hand or at both of his hands,
- the actuator A103 may be used to adjust at least one parameter of at least one radiant panel 7 or radiator,
- the actuator A104 may be used to adjust at least one aerothermal parameter of the heating, ventilation and/or air conditioning installation, for example the air flow from one or more diffusers 9 into a given area, or a plurality of areas, of the passenger compartment.

For its part, the control device 12 is capable of determining at least one thermal comfort data item or thermal sensation TS of the occupant on the basis of the measurements of the sensor or sensors 13, 113, and is capable of using the thermal comfort data item TS for controlling the actuators A101, A102, A103, A104. More precisely, the control device 12 is capable of controlling at least two of the actuators A101 to A104 in a differentiated way, in order to regulate the thermal state separately and locally in at least two different parts of the occupant's body.

The sensor advantageously comprises a thermal state sensor 13 capable of measuring at least one thermal quantity relating to the thermal state of at least one occupant of said vehicle, that is to say a quantity that may be used subsequently to determine whether the occupant is located in a predefined thermal comfort area, in other words in a thermally neutral area for the occupant, that is to say where the occupant feels neither hot nor cold. The thermal quantity may be any quantity that indicates a thermal sensation, that is to say whether the occupant is hot or cold or is located in the thermal comfort area.

Advantageously, the thermal state sensor 13 is capable of making a direct measurement relating to the occupant himself.

In particular, the thermal state sensor 13 may measure one or more thermal quantities related to different areas or parts of the occupant's body. The different parts of the occupant's body are, for example, the head, or more precisely one or more areas of the face, the nape of the neck, at least one shoulder, the chest, the back, at least one hand, at least one arm, at least one leg, and at least one foot and/or one ankle. Thermal quantities related to all these parts of the body, or, in a variant, to only some of the parts of the body, may be measured.

The thermal state sensor 13 is, for example, an infrared sensor. It is, advantageously, at least one infrared camera or infrared image capture apparatus or infrared imaging device.

According to a preferred embodiment, the sensor 13 may be used to produce an infrared map of the occupant's face, notably by identifying and measuring the temperature of distinctive points such as the nose, the cheeks and the forehead.

Additionally, or in a variant, the thermal state sensor 13 may be used to produce an infrared map of at least one of the occupant's hands.

Additionally, or in a variant, at least one camera or imaging device sensitive to wavelengths in the visible spectrum may be provided.

The combination of an infrared imaging device and visible field imaging device enables the data processing to be enriched. This is because an infrared image facilitates the recognition of the body parts and the positioning of the body in the visible image. In this case, the two images are to be read with one superimposed on the other. The information is then richer than that which would be provided by one or other of the imaging devices.

With reference to FIG. 1, the signals S(TMS) from the thermal state sensor 13 correspond to the measurements of the quantities related to the thermal state of at least one occupant of the motor vehicle. In the case of an infrared camera or an infrared image capture apparatus or infrared imaging device, the signals S(TMS) are, for example, in the form of a sequence of infrared images or one infrared image of an area of the passenger compartment where the occupant is located.

The thermal state sensor 13 is linked to the control device 12 which is capable of processing the signals S(TMS). The thermal state sensor 13 may be capable of supplying the signals S(TMS) to the control device 12. For this purpose, the thermal state sensor 13 may comprise at least one means for transmitting data to the control device 12.

Together with the measurements of quantities related to the thermal state of the occupant or occupants, other measurements are advantageously made, notably measurements relating to the environment of the passenger compartment in which the occupant of the vehicle moves.

For this purpose, the thermal management system 1 may comprise at least one sensor of the thermal environment 113 in the passenger compartment.

The sensor of the thermal environment 113 in the passenger compartment is capable of detecting and/or measuring at least one quantity chosen from among, notably, the operation of pieces of equipment for thermal regulation, for example the activation of the function for heating or cooling the seat 3, the activation of the function for heating the steering wheel 5, or the operation of one or more radiant panels 7, the surface temperature of a piece of equipment in the vehicle, such as at least one seat 3 or the steering wheel 5, or at least one glazing unit, aerothermal parameters such as:
the inside temperature in the passenger compartment,
the observed air flow rate,
the observed distribution of air via the diffusers 9,
the orientation of the air flow, for example whether the air flow is directed toward the head of the occupant of the vehicle,
the observed temperature outside the passenger compartment,
a temperature difference between the inside and the outside of the passenger compartment,
the solar flux,
the observed moisture content,
or other data describing the environment.

Advantageously, the data relating to the environment of the passenger compartment are differentiated according to the area of the passenger compartment concerned, for example left/right and/or front/rear.

The thermal environment sensor 113 may be an infrared sensor; in particular, it may be the same sensor as the thermal state sensor 13. Advantageously, it is at least one infrared camera or infrared image capture apparatus. It would be feasible to provide a plurality of additional thermal environment sensors 113 in addition to the infrared imaging device, in order, for example, to capture the thermal environment in the best possible way.

The thermal environment sensor, or each thermal environment sensor, 113 is capable of supplying signals S(PMS) to the control device 12. The thermal environment sensor 113 is therefore linked to the control device 12.

The control device 12 advantageously comprises one or more processing means 14, for:

receiving or acquiring the signals S(TMS) supplied by the thermal state sensor 13, and/or for receiving or acquiring the signals S(PMS) supplied by the thermal environment sensor 113, analyzing the signals S(TMS) and/or S(PMS) to determine at least one thermal comfort data item TS for the occupant.

The expression "thermal comfort data item" is taken to mean a data item providing an estimate of the thermal sensation of the occupant, that is to say whether he feels hot or cold or is located in the predefined thermal comfort area or thermally neutral area.

The quantities relating to the thermal state of the occupant, and advantageously to the characteristics of the thermal environment of the occupant of the vehicle, are used to estimate the thermal comfort data item or thermal sensation TS of a person, on the basis of the chosen thermal comfort model which comprises the thermo-physiological model and a model of the environment in the chosen vehicle.

The thermal comfort data item TS is determined by a modeling procedure, using an algorithm based on a chosen thermal comfort model comprising at least one thermo-physiological model based on the thermal sensations of a panel representative of the population whose body temperature has been measured in different conditions.

The thermal comfort model describes, notably, the behavior of the individual's body when certain conditions, notably limit conditions, are applied, for example if heat is applied to his back or if a jet of cool air reaches his face, and, consequently, the correction to be taken into account in the interpretation of the infrared map of his face, for example in order to determine a thermal comfort data item TS. On the basis of this correction information and information on the surroundings or the thermal environment in the passenger compartment, the control device 12 can calibrate measurements, which are infrared in this case, and preferably made at the face, in such a way that these measurements may be exploited.

By way of example, the patent FR 2,917,855 describes an example of a thermo-physiological model. As described in the patent FR 2,917,855, it is possible to take into account the thermal sensitivity category to which the occupant belongs, that is to say whether this person has a thermal sensitivity corresponding to the average population or is more sensitive to heat or cold than the average population. The characteristics of the clothing may also be used as described in the patent FR 2 917 855.

On the basis of the thermal comfort data item or items TS, the control device 12 can detect whether or not the occupant is located in the predefined thermal comfort area. For this purpose, the control device 12 may comprise at least one means for comparing the thermal comfort data TS with reference data or predefined target data. If this is not the case, that is to say if the occupant is outside the thermal comfort area, for example if he feels hot or cold, the control device determines that thermal regulation of the occupant is necessary.

In this case, the control device 12 is capable of determining parts of the body on which the thermal management system 1 is to act.

Additionally, the control device 12 advantageously comprises, among the processing means 14, at least one means for identifying the occupant's position in space, capable of locating at least one part of the occupant's body in space. The identification means is capable of using the measurements made by the thermal state sensor 13 to locate at least a part of the occupant's body in space.

If the thermal state sensor 13 is a camera or an imaging device capable of capturing at least one image or sequence of images, the identification means may comprise at least one image processing means capable of detecting different areas of one or more images captured by the thermal state sensor 13, and advantageously also capable of detecting the temperatures associated with these identified areas. The image processing means may be used to identify the occupant's position and to locate at least one part of the occupant's body on the basis of the data captured by the camera.

In the case of an infrared camera or imaging device, the hot elements are identified. The use of an infrared camera or infrared imaging device may advantageously be combined with the use of a camera or imaging device sensitive to the wavelengths in the visible spectrum for identifying and locating the position of the body.

In the patent FR 2 917 855, an example is given of the global identification of the face of a passenger or of the driver in space, and of the deduction of the temperatures in the different identified areas of the face. The identification of the face of an occupant of the vehicle is therefore not detailed again in the present document. According to one embodiment, after the face has been identified in space, the position of the body may be determined.

By way of non-limiting example, such identification makes it possible, notably, to detect whether the driver has his hands on the steering wheel, or whether the driver's or passenger's face is turned, and in which direction. This information may be used by the control device 12 to determine parts of the body on which the thermal management system 1 is to act, and to modify the commands for adjusting one or more pieces of equipment 3, 5, 7, 9.

The thermal management system 1 may also determine a thermal comfort data item TS which differs according to whether it concerns the occupant's right or the left side, for example as a result of the direct exposure of one of his sides to sunlight.

The control device 12 further comprises at least one processing means for identifying, for each part of the body, a piece of equipment 3, 5, 7, 9 of the vehicle to be controlled to regulate the thermal state of this part of the body, and consequently the actuators A101, A102, A103, A104 to be controlled. The control device 12 may then control at least two of the actuators A101 to A104 in a differentiated way for the control of the identified pieces of equipment in such a way as to regulate the thermal state of the occupant by acting on different parts of the body.

For this purpose, the control device 12 advantageously comprises one or more processing means 14, for:
- on the basis of the thermal comfort data item or items TS, defining or generating at least two control signals SC, including at least a first signal for controlling a first actuator and at least a second signal for controlling a second actuator, and
- transmitting the defined control signals SC in order to control at least two of the actuators A101 to A104 in a differentiated way, for example via the respective outputs of the control device 12.

In the example shown in FIG. 1, four control signals SC1, SC2, SC3, SC4 are represented schematically. Evidently, there may be more or fewer control signals SC.

If the thermal management system 1 determines thermal comfort data items TS which differ according to whether they concern the occupant's right or left side, this information is taken into account by the control device 12 for the definition of the control signals SC, for example for adjusting the air temperature for each side or adjusting the orientation of the air flow.

The thermal management system 1 may further comprise at least one acquisition means for determining or detecting one or more temporal data items t or data items for time sequencing a usage scenario of the vehicle. An example of a temporal data item t that may be mentioned is, if the occupant has just entered the vehicle, the period for which the occupant has been sitting on the seat, the period for which the vehicle has been moving, or the period for which a given piece of thermal regulation equipment, and its orientation if appropriate, has been in operation.

It may take the form of a temporal management module of the thermal management system 1. In particular, it may take the form of a processing means 14 of the control device 12.

The set of temporal data t may be taken into account by the control device 12 for the definition of the control signals SC. The control device 12 may take into account whether the occupant has just entered the vehicle or has been in the vehicle for a certain period, in order to choose whether or not to control certain pieces of equipment, for example by activating the heating function of the seat 3. In fact, as an illustration of this concept, it has been found, for example, that, in winter, when a person enters a vehicle where the passenger compartment environment is cold, it is very pleasant to activate the heated seat at this moment, but that long-term heating on a person's back during a long journey is very unpleasant and is therefore perceived as discomfort by this person.

The comfort commands that the control device 12 can control via the actuators A101, A102, A103, A104 relate, for example, to:
- the activation of the heating function of the steering wheel 5,
- the temperature of the steering wheel 5,
- the activation of the heating or cooling function of the seat 3 where the occupant is located,
- the temperature of the seat 3,
- the activation of one or more radiant panels 7,
- the activation of a heating function of one or more glazing units of the passenger compartment,
- the temperature of one or more glazing units of the passenger compartment,
- the adjustment of the opacity/transparency of one or more electrochromic glazing units of the passenger compartment,
- the temperature of the air blown toward the passenger compartment,
- the moisture content of the air blown toward the passenger compartment,
- the air flow rate,
- the distribution of air blown into the passenger compartment via the various diffusers 9,
- an air recirculation percentage, in other words the distribution between the fresh outside air and the recirculating air taken from the passenger compartment,
- the distribution of hot/cold air in the air blown toward the passenger compartment,
- the speeds of the various motorized fan units used in the heating, ventilation and/or air conditioning installation.

EXAMPLES OF EMBODIMENT

Thus, for a thermal comfort data item TS indicating that the occupant is not in the predefined thermal comfort area, the thermal management system 1 may perform actions for the purpose of regulating the occupant's thermal state in different places on his body, for example for a predetermined time interval and/or until the thermal comfort data item TS indicates a neutral state. In other words, the thermal management system 1 applies what are known as positive stimuli to different parts of the occupant's body.

In particular, the heat sources acting on different segments or parts of the occupant's body may be of different kinds, acting for example by convection on his head, by radiation on his chest, and by contact on his hands and back. Consequently, vectors other than air are used to focus the thermal regulation on certain parts of the occupant's body.

By way of an illustrative and non-limiting example, for a thermal comfort data item TS indicating that the occupant feels hot, the thermal management system 1 may perform actions for the purpose of cooling the occupant at different places on his body.

For example, the thermal management system 1 may command an actuator A104 to start producing a jet of cool air to cool the occupant by convection from his head. The thermal management system 1 may also command the actuator A101 to activate the cooling function of the seat 3 on which the occupant is sitting, to cool the occupant by contact with his back. At the same time, the thermal management system 1 may switch on the air conditioning for cooling the air directed to the passenger compartment.

According to another example, for a thermal comfort data item TS indicating that the occupant feels cold, the thermal management system 1 may perform actions for the purpose of cooling the occupant at different places on his body. For example, the thermal management system 1 may command the actuator A103 to switch on at least one radiant panel 7, to heat the occupant's chest by radiation, for example. The thermal management system 1 may also command the actuator A101 to activate the heating function of the heated seat 3 on which the occupant is sitting, to heat the occupant by contact with his back. The thermal management system 1 may also command the actuator A102 to activate the heating function of the steering wheel 5 to heat the occupant by contact with his hands. At the same time, the thermal management system 1 may switch on the heating of the air directed to the passenger compartment.

As a variant, or additionally, if the thermal management system 1 determines a thermal comfort data item TS that differs according to the side, the control device 12 commands the actuators so as to adjust the thermal comfort between the two sides.

Evidently, therefore, according to the value of the thermal comfort data item or items TS, the passenger compartment environment data such as, notably, the inside temperature of the passenger compartment and the temperature outside the passenger compartment, and, advantageously, temporal data that indicate, notably, a time sequencing of a usage scenario of the vehicle, if the user has just entered the vehicle for example, the thermal management system 1 may command at least two pieces of equipment to act in a differentiated way on two or more different parts of the occupant's body. This applies localized positive stimuli to a plurality of parts of the occupant's body, thus enabling the occupant, particularly in a transient situation, to wait until the passenger compartment reaches a comfortable temperature. This is because the occupant's sensation of discomfort is reduced by acting as closely to him as possible, using different heat sources, by contact, radiation or convection, and not simply by acting on the air in his environment.

The thermal management system 1 may thus modify the seat temperature, the steering wheel temperature, the opacity or transparency of a glazing unit, the temperature of a glazing unit, the opening or closing of diffuser nozzles on the dashboard or in the rear of the motor vehicle, the opening or closing of shutters for blocking diffuser canals, the turning on or off of an air propulsion unit, the turning on of the air conditioning, the air flow rate, a heating device of the heating, ventilation and/or air conditioning installation, or the proportion of air recycled or brought in from the outside. Thus the thermal management system 1 according to the invention makes it possible to combine different technologies to regulate the thermal state of the occupant.

The thermal management may be provided automatically; in particular, the choice of pieces of equipment on which to act, and therefore the choice of the associated actuators, may be made without any action by the occupant. Evidently, provision may be made for the occupant to choose or modify at least one given parameter, via a human-machine interface for example. In particular, the occupant may modify an adjustment according to his thermal sensitivity.

Finally, the thermal management system 1 may have what is known as a degraded operating mode, notably in the case where the thermal management system 1 is unable to make at least some of the measurements required for the prediction of a thermal comfort data item TS relating to the occupant. This degraded operating mode may be based on a statistical predictive model which allows a default adjustment of at least two pieces of equipment, for example, according to the external conditions. With this degraded mode, provision may also be made for the occupant to choose or modify at least one given parameter.

Thermal Management Method

The invention also relates to a thermal management method implemented by a thermal management system 1 for a motor vehicle as defined above.

Figure 3:
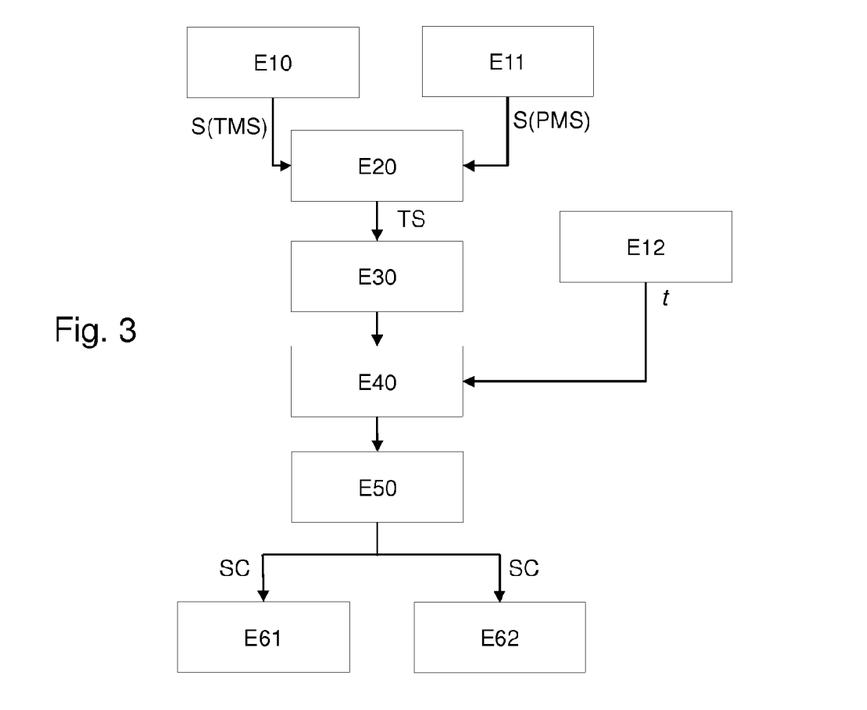
FIG. 3 shows a schematic representation of the steps of a thermal management method implemented by the thermal management system.

With reference to FIG. 3, the thermal management method comprises different steps E10 to E62, described below.

The thermal management method comprises, notably, a step E10 of acquiring a measurement or measurements of one or more thermal quantities relating to the occupant, for example those corresponding, respectively, to a different part or area of the body of an occupant of the motor vehicle. According to the embodiment described here, this acquisition step E10 is, executed by the thermal state sensor 13.

According to a preferred embodiment, the step E10 is a step of capturing at least one image or sequence of images in the infrared spectrum and/or in the visible spectrum.

Provision may be made for a step of transmitting signals S(TMS) corresponding to the measurements of the thermal quantities relating to the thermal state of the occupant, made, for example, by the thermal state sensor 13.

The thermal management method may further comprise a step E11 of acquiring a measurement or measurements relating to the thermal conditions of the occupant's environment. This acquisition step E11 may be executed by the same device as that used for step E10, such as an infrared imaging device, and/or by one or more other thermal environment sensors in the passenger compartment 113.

Provision may be made for a step of transmitting signals S(PMS) corresponding to the measurements of the thermal quantities relating to the environment, made, for example, by the thermal environment sensor or each thermal environment sensor in the passenger compartment 113.

The thermal management method advantageously also comprises a step E12 of acquiring at least one temporal data item t concerning the usage scenario of the vehicle, for example, but not exclusively, whether the occupant has just entered the vehicle, or the period for which he has been in the vehicle. This step E12 of acquiring at least one temporal data item t may be executed by a temporal management system of the thermal management system 1; in this case, the temporal data items t may be transmitted to the control device 12. In a variant, this step E12 of acquiring at least one temporal data item t may be executed by at least one processing means 14 of the control device 12.

The thermal management method further comprises a step E20 of determining at least one thermal comfort data item TS relating to the occupant on the basis of the measured quantities. These quantities are, notably, those relating to the thermal state of the occupant, measured by the thermal state sensor 13. Additionally, they may be quantities relating to the thermal environment, measured by the thermal environment sensor or sensors 113.

For this purpose, the determination step E20 comprises at least:
- a substep of receiving or acquiring signals S(TMS) and/or S(PMS) for example, by the control device 12 of the thermal management system 1,
- a substep of processing and analyzing the signals S(TMS) and/or S(PMS) in order to determine at least one thermal comfort data item TS relating to the occupant.

According to a preferred embodiment, step E20 comprises a substep of analyzing an image or sequence of images and identifying distinctive points, on the occupant's face for example, in order to identify the temperature at these distinctive points.

Advantageously, step E20 comprises a substep of identifying the occupant's body in space.

Advantageously, step E20 comprises a substep of determining the occupant's position in the vehicle, for example the orientation of the occupant's face, or whether the driver has one or both hands on the steering wheel.

In a step E30, the thermal management method may be used to identify whether the occupant requires thermal regulation on the basis of the thermal comfort data item or items TS determined in step E20, for example by comparing the thermal comfort data item, or each thermal comfort data item, TS with a predefined reference or target data item.

If thermal regulation is required, the thermal management method determines, in step E40, at least two parts of the occupant's body on which to act.

For the determination of the parts of the occupant's body on which to act, the thermal management method advantageously takes into account the occupant's position in the vehicle.

The thermal management method also advantageously takes into account the set of temporal data items t concerning the usage scenario of the vehicle.

In step E50, the thermal management method identifies, among the pieces of equipment in the vehicle, the associated piece of equipment to be commanded to act on each part determined in step E40. In particular, the thermal management method may be used to identify at least a first piece of equipment associated with a first part of the occupant's body and at least a second piece of equipment associated with a second part of the occupant's body. The identified pieces of equipment are advantageously heat sources of different kinds.

When the pieces of equipment to be controlled have been identified, the thermal management method may be used to generate or define control signals SC to be sent to the actuators for controlling the respective pieces of equipment. These control signals SC are configured for adjusting at least one parameter of at least two pieces of equipment of the vehicle on the basis of the thermal comfort data item or items TS relating to the occupant.

The control signals SC advantageously comprise at least one data item concerning the location of the pieces of equipment to be controlled.

The control signals SC may also comprise at least one data item concerning the power of the pieces of equipment to be controlled.

For the definition of the control signals SC, the thermal management method advantageously takes into account the occupant's position in the vehicle, in order to modify the adjustment of the pieces of equipment on the basis of this position of the occupant. By way of non-limiting example, if the occupant's head is facing in a certain direction, a control signal SC4 is sent to an actuator A104 to control the orientation of the air flow through a given diffuser 9.

Thus, in a step E61, at least a first control signal is defined and sent to a first actuator configured for adjusting at least one parameter of a first associated piece of equipment capable of regulating the thermal state of the occupant at a first part of the occupant's body.

In a step E62, at least a second control signal is defined and sent to a second actuator configured for adjusting at least one parameter of a second associated piece of equipment capable of regulating the thermal state of the occupant at a second part of the occupant's body, different from the first part of the occupant's body.

This enables the thermal state of the occupant to be regulated in a differentiated way at different parts of his body.

According to one embodiment, the control signals SC may comprise at least one predefined timing data item. By way of non-limiting example, the local action performed on a given part or area of the body by activating or adjusting an associated piece of equipment may be carried out for a predefined period. According to another example, at the end of a predefined period the power of one or more given pieces of equipment is reduced.

In a variant, or additionally, the timing data item may comprise the reaching of a condition of thermal neutrality; in other words, the local action performed on a given part or area of the occupant's body by activating or adjusting an associated piece of equipment may continue until the occupant is in the predefined thermal comfort area. In this case, steps E10 to E20 may be executed in parallel with steps E61 and E62.

According to another example, the power of one or more given pieces of equipment is reduced when the occupant is in the predefined thermal comfort area.

Evidently, the order of at least some of the steps of this thermal management method may be reversed.

Thus it is possible to execute a thermal management method for which one or more measurement means or sensors 13, 113, notably infrared, may be used, and in which the measurements made by these sensors 13, 113, are used to define the control signals SC sent toward the actuators A101, . . . , A104 of pieces of equipment in the passenger compartment or the heating, ventilation and/or air conditioning installation, so as to act in a differentiated way on different segments of the occupant's body according to the thermal comfort data item or items TS relating to the occupant that have been determined.

An advantageous form of comfort management is provided by combining and linking the application of the heat flows in a localized way on different parts or areas of the occupant's body, and managing the temperature in the passenger compartment in a global way, in order to provide the best possible sensation of comfort in different phases of the use of a vehicle.

The invention claimed is:

1. A thermal management system for a motor vehicle, said vehicle comprising at least two pieces of equipment, said thermal management system comprising:
 at least one sensor capable of measuring at least one quantity that can be used to determine at least one thermal comfort data item representative of the thermal state of at least one occupant of said vehicle; and
 a control device, for:
  determining at least one thermal comfort data item (TS) on the basis of the measurements of said at least one sensor, and
  using said at least one thermal comfort data item for determining whether thermal regulation is required,
 wherein the control device comprises at least one processing means, for performing the following operations on the basis of said at least one thermal comfort data item:
  identifying at least a radiant panel for acting on the occupant's body when thermal regulation is required.

2. The thermal management system as claimed in claim 1, further comprising a means of acquiring at least one temporal data item of a usage scenario of said vehicle, said at least one temporal data item being usable for the identification of said pieces of equipment to be controlled for the local regulation of the thermal state of the occupant's body.

3. The thermal management system as claimed in claim 1, wherein said at least one sensor comprises at least one thermal state sensor, such as an infrared sensor, capable of measuring at least one thermal quantity relating to the thermal state of at least one occupant of said vehicle.

4. The thermal management system as claimed in claim 1, wherein said at least one sensor comprises a predetermined number of sensors of the thermal environment in the passenger compartment of said vehicle.

5. The thermal management system as claimed in claim 1, wherein the control device comprises at least one processing means for determining said at least one data item, using an algorithm based on a chosen comfort model comprising at least one thermo-physiological model based on the thermal sensations of a panel representative of the population whose body temperature has been measured in different conditions.

6. The thermal management system as claimed in claim 1, wherein the at least two pieces of equipment provide heat exchanges of different kinds by convection, by radiation, or by conduction.

7. The thermal management system as claimed in claim 1, wherein the occupant's body is at least one area of the face, the nape of the neck, at least one shoulder, the chest, the back, at least one hand, at least one arm, at least one leg, at least one foot and/or one ankle.

8. The thermal management system as claimed in claim 1, further comprising at least one identification means capable of locating at least one part of the occupant's body in space, using the measurements made by said at least one sensor.

9. The thermal management system as claimed in claim 8, wherein
 said at least one sensor is capable of capturing at least one image or sequence of images, and
 the identification means comprises at least one image processing means for locating at least one part of the occupant's body on the basis of the captured image(s), and for determining the position of the occupant.

* * * * *